US012786674B2

(12) United States Patent
Iyer

(10) Patent No.: US 12,786,674 B2
(45) Date of Patent: Nov. 3, 2026

(54) ALLOCATING PROCESSING RESOURCES OF 5G-ENABLED VEHICLES

(71) Applicant: DISH Network Technologies India Private Limited, Bengaluru (IN)

(72) Inventor: Satish Iyer, Bengaluru (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 685 days.

(21) Appl. No.: 18/187,182

(22) Filed: Mar. 21, 2023

(65) Prior Publication Data

US 2024/0323659 A1 Sep. 26, 2024

(51) Int. Cl.

*H04W 4/40* (2018.01)
*H04W 12/06* (2021.01)
*H04W 52/02* (2009.01)
*H04W 84/18* (2009.01)

(52) U.S. Cl.

CPC ............ *H04W 4/40* (2018.02); *H04W 12/06* (2013.01); *H04W 52/0261* (2013.01); *H04W 84/18* (2013.01)

(58) Field of Classification Search

CPC ... H04W 4/40; H04W 12/06; H04W 52/0261; H04W 84/18
USPC .......................................................... 370/252
See application file for complete search history.

(56) References Cited

U.S. PATENT DOCUMENTS 12,185,230 B2 * 12/2024 Ding ...................... H04W 4/40
2022/0394557 A1 * 12/2022 Falla Cepeda .......... H04W 4/02
2023/0171576 A1 * 6/2023 Trim ................. H04W 52/0261 455/404.2
2024/0373312 A1 * 11/2024 Garcia Morchon ......................... H04L 67/5681
2025/0097286 A1 * 3/2025 Li ....................... H04L 67/1008

OTHER PUBLICATIONS

Jing Zhang, "Edge Computing-Based Privacy-Preserving Authentication Framework and Protocol for 5G-Enabled Vehicular Networks", Jul. 2020, IEEE, vol. 69, 7940-7954 (Year: 2020).*
Jing Zhang, "Edge Computing-Based Privacy-Preserving Authentication Framework and Protocol for 5G-Enabled Vehicular Networks", Jul. 2020, IEEE, vol. 69, 7940-7954 (Year: 2020) (Year: 2020).*

* cited by examiner

*Primary Examiner* — Kwang B Yao
*Assistant Examiner* — Syed M Bokhari
(74) *Attorney, Agent, or Firm* — Kilpatrick Townsend & Stockton LLP

(57) ABSTRACT

Systems and methods for allocating processing resources of 5G-enabled vehicles for endpoint users are provided. In one example, a method includes: receiving a request from a user equipment (UE) in an endpoint environment, the request indicating a demand for processing resources on an edge server to perform a task for the UE; identifying a first 5G-enabled vehicle in proximity to the endpoint environment; determining an operational state and a power state of the first 5G-enabled vehicle; determining availability of a first processing resource carried by the first 5G-enabled vehicle; determining whether the first processing resource carried by the first 5G-enabled vehicle meets the demand of the user equipment; and allocating the first processing resource carried by the first 5G-enabled vehicle and causing the first 5G-enabled vehicle to serve as an edge server to perform the task for the user equipment using the allocated first processing resource.

18 Claims, 12 Drawing Sheets

ALLOCATING PROCESSING RESOURCES OF 5G-ENABLED VEHICLES

BACKGROUND OF THE DISCLOSURE

With massive growth in digital data volume and proliferated use of smartphones, laptops, and tablets, growth of the Internet of Things (IoT) market, and increasing penetration of high-end cloud computing, demand for computing and data storage continues to grow at an increasing rate. Along with increasing amounts of connected devices, including those in computers, wireless devices, cellular telephones, data centers, servers, sensors, and other network or communication hubs, etc., there is an increase in idle or otherwise available processing resources (e.g., computing and storage resources). For example, many electric products are equipped with high-end computing and storage resources that need not be in continuous use or at full capacity to perform the primary tasks of the electric products. There is a need to allocate these idle and surplus processing resources to consumers in need thereof.

BRIEF SUMMARY OF THE DISCLOSURE

In accordance with some embodiments of the present disclosure, a computer-implemented method is provided. In one example, a method includes: receiving a request from a user equipment (UE) in an endpoint environment, the request indicating a demand for processing resources on an edge server to perform a task for the UE; in response to the request, identifying a first 5G-enabled vehicle in proximity to the endpoint environment; determining an operational state and a power state of the first 5G-enabled vehicle; in response to the determination that the operational state is idle and that the power state is above a predetermined threshold, determining availability of a first processing resource carried by the first 5G-enabled vehicle; in response to the determination that the first 5G-enabled vehicle carries the first processing resource that is available, determining whether the first processing resource carried by the first 5G-enabled vehicle meets the demand of the user equipment; and in response to the determination that the first processing resource meets the demand of the user equipment, allocating the first processing resource carried by the first 5G-enabled vehicle and causing the first 5G-enabled vehicle to serve as an edge server to perform the task for the user equipment using the allocated first processing resource.

In accordance with some embodiments of the present disclosure, a system is provided. In one example, the system includes one or more processors; and a computer-readable storage media storing computer-executable instructions that, when executed by the one or more processors, causes the cell site environment monitoring device to: receive a request from a user equipment (UE) in an endpoint environment, the request indicating a demand for processing resources on an edge server to perform a task for the UE; in response to the request, identify a first 5G-enabled vehicle in proximity to the endpoint environment; determine an operational state and a power state of the first 5G-enabled vehicle; in response to the determination that the operational state is idle and that the power state is above a predetermined threshold, determine availability of a first processing resource carried by the first 5G-enabled vehicle; in response to the determination that the first 5G-enabled vehicle carries the first processing resource that is available, determine whether the first processing resource carried by the first 5G-enabled vehicle meets the demand of the user equipment; and in response to the determination that the first processing resource meets the demand of the user equipment, allocate the first processing resource carried by the first 5G-enabled vehicle and cause the first 5G-enabled vehicle to serve as an edge server to perform the task for the user equipment using the allocated first processing resource.

In accordance with some embodiments, the present disclosure also provides a non-transitory machine-readable storage medium encoded with instructions, the instructions executable to cause one or more electronic processors of a system to perform operations of a method or a process described herein.

BRIEF DESCRIPTION OF THE DRAWINGS

A further understanding of various embodiments may be realized by reference to the following figures. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

DETAILED DESCRIPTION OF THE DISCLOSURE

Figure 1A:
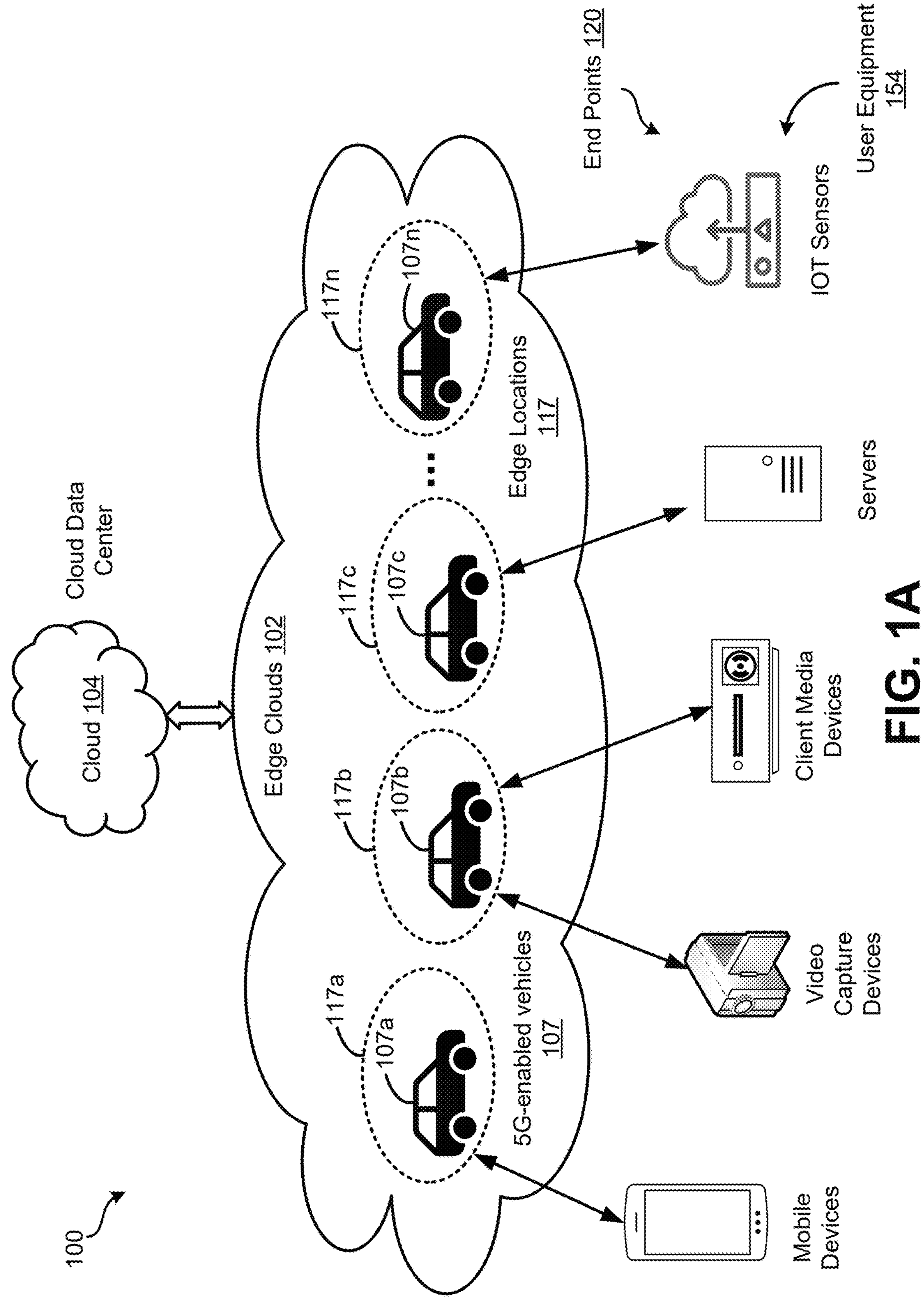
FIG. 1A is a schematic diagram illustrating an overview of an example of an edge cloud configuration of 5G-enabled vehicles as edge servers for edge computing, according to various embodiments.

As mentioned above, consumer demands on processing resources grow at an increasing rate. Particularly, edge computing becomes ever attractive to both individual users and enterprises. Edge computing is a distributed computing paradigm that brings computation and data storage of an edge server in an edge location closer to the endpoint user. This could improve response times, save bandwidth, and bring solutions to the "last-mile" problem in telecommunication services. However, computing, processing, memory, and data storage are scarce resources, and generally decrease depending on the edge location (e.g., fewer processing resources being available at consumer endpoint devices than at a base station or at a central office).

On the other hand, more and more vehicles and transportation tools are now enabled with the fifth generation (5G) telecommunication technologies. Many of these 5G-enabled vehicles are equipped with premium processing resources (e.g., high-end processor, large memory and storage device, 5G network bandwidth, etc.). However, when these 5G-enabled vehicles are not in operation (e.g., parking in a garage, charging), the processing resources carried by the vehicles become idle or not in full use, and if accumulated, can be a significant waste of resources. Thus, there is a need to allocate these processing resources of idle 5G-enabled vehicles for the benefit of customers in need thereof.

The present disclosure provides techniques for allocating available processing resources carried by 5G-enabled vehicles and transforming the idle 5G-enabled vehicles into edge servers that remotely perform tasks for endpoint users using the available processing resources.

In accordance with various embodiments, a method/process is provided to increase computing resources and data storage for remote user equipment and devices. One insight provided by the present disclosure is that the method can be used to intelligently identify, select available processing resources on idle 5G-enabled vehicles and tapping into these available processing and data storage resources to harness these resources on behalf of other remote devices to increase the amount of processing resources to perform tasks and store data for various services.

Another insight provided by the present disclosure is that the method can be used to enhance an edge environment. The method can be used to convert idle and yet available and accessible 5G-enabled vehicles into edge computing resources in edge locations that are in closer proximity to endpoint environments (e.g., user equipment). The method can be used to orchestrate these edge computing resources from the idle 5G-enabled vehicles for content-delivery network (CDN) and other applications.

A further insight provided by the present disclosure is that the method can be used to generate a mesh network composed of a plurality of 5G-enabled vehicles. These 5G-enabled vehicles are idle and communicatively interconnected, and the computing resources provided by these 5G-enabled vehicles can be allocated for the endpoint environments and organized and configured by the mesh network to improve the overall efficiency of data routing between the endpoint environment and the mesh network.

Yet another insight provided by the present disclosure is that the method can provide security measures to protect a 5G-enabled vehicle when the 5G-enabled vehicle is providing computing resources and performing a task requested by the user equipment in the endpoint environment. Upon detection of a malicious event (e.g., a malware, privacy data leakage, etc.) or a risk of harm (e.g., loss of authenticated status of the user equipment, unauthorized use of computing resources, etc.) to the 5G-enabled vehicle, security measures are effectuated to protect the 5G-enabled vehicle, for example, ceasing allocation of the computing resources, terminating communication with the user equipment, or blocking further access from the user equipment.

FIG. 1A is a schematic diagram illustrating an overview of an example of an edge cloud configuration of 5G-enabled vehicles as edge servers for edge computing, according to various embodiments. In the illustrated example, a communications system 100 includes a cloud (also referred to as a "cloud data center") 104 in communication with one or more edge clouds 102. Each of the edge clouds 102 is co-located at an edge location 117, wherein one or more idle 5G-enabled vehicles 107 are located. Examples of the edge location encompass any geographic locations a 5G-enabled vehicle can be located at an idle and/or a non-moving state. Common edge locations include but are not limited to parking places at or near home, street, public area, office and business buildings, commercial buildings, or anywhere in a populated city area. These 5G-enabled vehicles 107 can each serve as an edge server and provide processing resources to the endpoint environment 120 that is in close proximity to the edge locations 117. In some embodiments, a local processing hub (not shown) may be placed in the edge location 117 to facilitate communication between the 5G-enabled vehicles and the endpoint environment 120. The edge clouds 102 is located much closer to the endpoint environment 120 than the cloud data center 104. The endpoint environment 120 may include consumer and producer data sources such as user equipment, business equipment, and industrial equipment. Examples of the user equipment that can communicate with the 5G-enabled vehicles and utilize the processing resources thereof include but are not limited to mobile devices, video capture devices, client media devices, servers, drones, smart cities and building devices, sensors, and IoT devices. Due to the proximity of the edge location to the endpoint environment, these 5G-enabled vehicles can greatly benefit the end users in the endpoint environment, provide edge computing resources to meet the end user's demand, provide last-mile distribution of content to the end users, increase bandwidth for the end users, and enhance the rate of content delivery. Further, the edge locations 117 can provide ultra-low latency response times for services and functions used by the endpoint user equipment 154, reduce network backhaul traffic from the edge clouds 102 toward cloud data center 104, improve energy consumption, and enhance and overall network usages among other benefits.

Figure 1B:
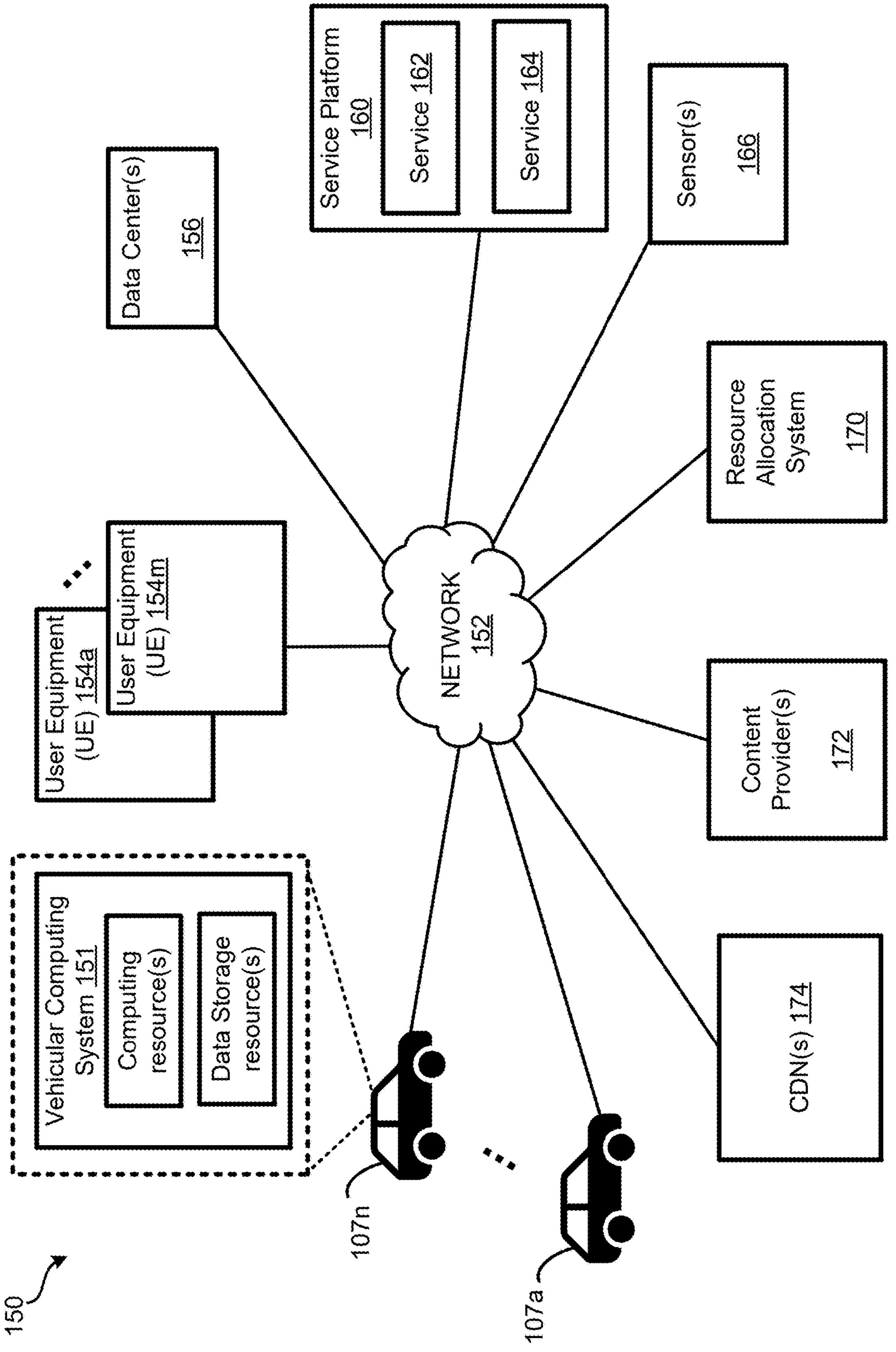
FIG. 1B is a schematic diagram illustrating an example communications system utilizing available processing resources of idle 5G-enabled vehicles, according to various embodiments.

FIG. 1B is a schematic diagram illustrating an example communications system 150 utilizing processing resources of idle 5G-enabled vehicles, according to various embodiments. The system 150 includes one or more 5G-enabled vehicles 107 (e.g., 107*a*, 107*b*, . . . , 107*n*) that are in an idle, non-moving, and/or inoperative state. Each of the 5G-enabled vehicles includes a vehicular computing system 151. The vehicular computing system 151 contains processing resources such as computing resources, memory device, and data storage resources. The 5G-enabled vehicles 107 are communicatively interconnected with each other through network 152. Further, the 5G-enabled vehicles 107 are also connected to various user equipment 154 (e.g., 154*a*, 154*b*, . . . , 154*m*) through the network 152. Also, user equipment 154 may include, or be part of, various types of devices including, but not limited to: smartphones, tablets, notebook computers, mobile devices, sensors, vehicles, autonomous vehicles, machinery, appliances, smart speakers, digital assistants, security cameras, monitoring devices, home electronics, media players, receiving devices, set-top boxes, other computing devices and IoT devices, etc.

Network 152 may also provide connectivity to other networks and geographically separated devices, such as service platform 160, sensor(s) 166, and devices in data center(s) 156 (e.g., local data centers, regional data centers, national data centers), content provider(s) 172, content delivery network(s) 174, and a resource allocation system 170. In some embodiments, network 152 includes the main mobile core network which provides subscriber profile information, subscriber location, authentication of services, and the necessary switching functions for voice and data sessions, including circuit-switched services, packet-switched services. Network 152 may also provide cloud-aligned, service-based architecture (SBA) that spans across various functions and interactions including authentication, security, session management, and aggregation of traffic from end devices. Network 152 may also include equipment and provide functionality to provide Internet connectivity to the user equipment 154 and connectivity to other devices and systems, such as service platform 160, sensor(s) 166, and devices in data center(s) 156, content provider(s) 172, content delivery network(s) 174, and the resource allocation system 170, via other additional or integrated networks. For example, network 152 may include one or more computer networks, one or more wired or wireless networks, satellite transmission media, one or more cellular networks, the Internet or some combination thereof, including routers, switches, gateways and other network equipment providing such connectivity. The network 152 may include a publicly accessible network of linked networks, possibly operated by various distinct parties, such as the Internet. In some embodiments, the network is a 5G-based network, such as the cloud data center 104 of FIG. 1A.

In some embodiments, user equipment 154 or endpoint user devices within the system 150 may utilize additional client computing systems and/or other client devices (not shown) which interact with the resource allocation system 170 to obtain and utilize various described processing resources of the 5G-enabled vehicles 107 via the network 152. In certain embodiments, the various endpoint user equipment and user devices of the system 150 may interact with the resource allocation system 170 and/or one or more other devices using an optional private or dedicated connection to obtain and utilize various described processing resources of the 5G-enabled vehicles 107.

In some embodiments, the 5G-enabled vehicles 107 each carry a small-scale 5G cell (e.g., a 5G microcell, a 5G minicell, a 5G small cell, a 5G femtocell, or a 5G picocell, or the like). The small-scale 5G cells are a major feature of 5G mobile networks particularly at the millimeter wave (mmWave) frequencies where the connection range is very short. Small-scale 5G cells are mini cell sites or base stations designed for localized coverage typically from a few meters to a few hundred meters providing in-fill for a larger macro network. The 5G cells equipped on the 5G-enabled vehicles can provide 5G cellular network that further facilitate the communication among the 5G-enabled vehicles 107 as well as between the 5G-enabled vehicles 107 and the user equipment 154 that are in close proximity to the 5G-enabled vehicles.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them. Characteristics of the MEC include the low latency, last mile telecommunication, high bandwidth, high speed, and real time access to RAN information that distinguish 5G architecture from its predecessors. In some embodiments, this low latency, high bandwidth and real time access to an increasing number of small and macro 5G cells equipped on the 5G-enabled vehicles, is utilized in a unique way to tap into the available processing resources at these computing nodes to harness these processing resources on behalf of other endpoint user equipment and user devices demanding such processing resources. In some embodiments, the scheduling and allocation of such processing resources may be performed and/or facilitated by the resource allocation system 170, or the interaction of the vehicular computing system 151 and the resource allocation system 170, or the communications system 150.

Figure 1C:
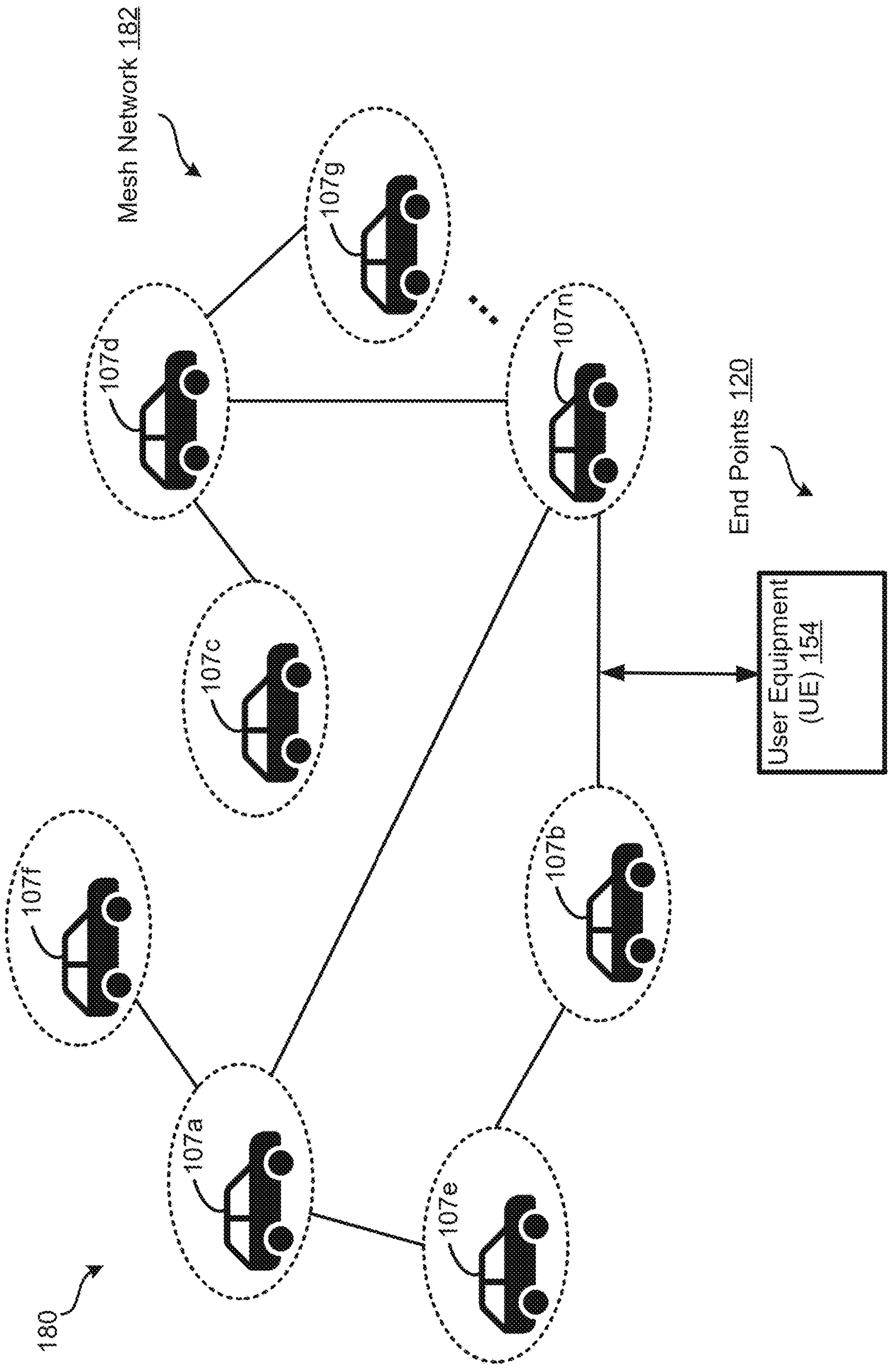
FIG. 1C is a schematic diagram illustrating an example communications system utilizing a mesh network of idle 5G-enabled vehicles, according to various embodiments.

FIG. 1C is a schematic diagram illustrating an example communications system 180 utilizing a mesh network of idle 5G-enabled vehicles, according to various embodiments. As used herein, a "mesh network" refers to a network architecture that utilizes different nodes of the network to relay communications or portions of communications between nodes of the network. For example, a communication between a first and second network node may be relayed or otherwise routed through one or more other network nodes. The term "mesh network" is used herein is distinguished from a point-to-point network, which includes communications that occur directly between a sending node and a receiving node. In one embodiment, the mesh network is implemented with the "ZigBee" networking protocol.

In the illustrated example of FIG. 1C, a mesh network 182 is composed of a plurality of idle 5G-enabled vehicles 107 with each one of the 5G-enabled vehicles serving as a computing node of the mesh network. The mesh network 182 is communicatively connected to the endpoint user equipment 154, providing the user equipment 154 with the available and allocatable processing resources of each computing node of the mesh network 182. The mesh network 182 allows for message transmission in geographic regions that are large, lack reliable power sources, are difficult and/or dangerous to reach, and/or are otherwise poorly suited to typical networking solutions. The mesh network 182, as described herein, may allow for the timely identification and resolution of needs at locations covered by the mesh network 182. User equipment 154 within the coverage of the mesh network 182 may be able to access the wide-area mesh network to send messages, without requiring specialized hardware and/or software. For example, the 5G-enabled vehicles (e.g., thousands to millions) in a city can form a wide-area mesh network. Due to the increasing number and the mobility of the 5G-enabled vehicles as well as the flexibility of the edge locations that the 5G-enabled vehicles can create, the wide-area mesh network can extend the edge cloud to almost every corner in the city, thereby making the edge locations closer and more accessible to the endpoint users. In another example, a plurality of 5G-enabled vehicles (e.g., the 5G-enabled vehicles that are parked in one parking garage) can form a local mesh network in a particular edge location. The processing resources from these 5G-enabled vehicles in the local mesh network can be further organized and integrated to better serve the endpoint users in proximity to the particular edge location.

Figure 2:
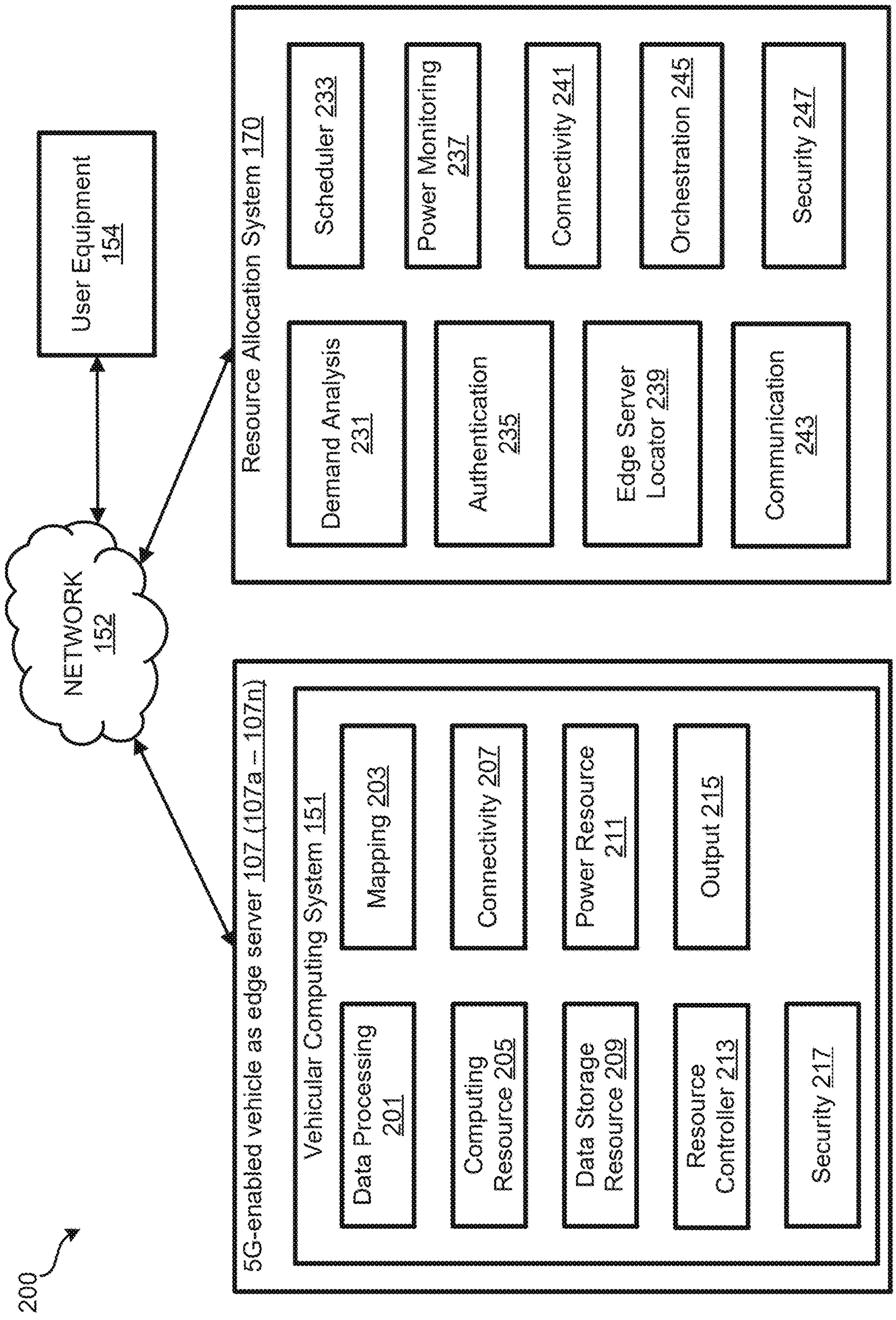
FIG. 2 is a schematic diagram illustrating an example communication system according to various embodiments.

FIG. 2 is a schematic diagram illustrating an example communication system 200 according to various embodiments. The communication system 200 includes, among other components, one or more 5G-enabled vehicles 107 (FIG. 1), a resource allocation system 170 (FIG. 1), network 152, and user equipment 154. The one or more 5G-enabled vehicles 107 can serve as edge servers and provide the user equipment in the endpoint environment with available and allocatable processing resources. In the illustrated example of FIG. 2, each 5G-enabled vehicle 107 includes a vehicular computing system 151. The vehicular computing system 151 includes, among other components, a data processing component 201, a mapping component 203, computing resources 205, a connectivity component 207, data storage resources 209, power resources 211, a resource controller 213, an output component 215, and a security component 217. The above presented components of the vehicular computing system 151 can be implemented in hardware, firmware, software, or a combination thereof.

The data processing component 201 can process data received from external sources (e.g., geographic databases, mapping services, map databases, etc.) as well as data generated by other components of the 5G-enabled vehicle 107. The mapping component 203 can determine location data associated with the 5G-enabled vehicle 107, for example, via location sensor data and/or probe data of the 5G-enabled vehicle 107. For instance, the mapping component 203 can determined geographic position of the 5G-enabled vehicle 107 or expected position(s) thereof according to a planned route, mobility data, driving history data, etc.

The computing resources 205 generally include vehicular one-board resources, for example, hardware, execution environment capabilities, network capabilities, etc. For instance, the hardware may include CPU cores, graphics processing (GPU) Cores, architecture types, RAM, storage capacity, sensors, etc. The execution environment capabilities may include operating systems, virtualization capabilities, supported programming languages, supported neural network definitions, etc. The network capabilities may include network access, bandwidth, etc. In some embodiments, the 5G-enabled vehicles 107 are contain autonomous driving systems, which require powerful computing resources, such as GPU-based hardware to enable computer vision applications, dynamic simulations, etc., in a three-dimensional (3D) space. Such hardware also can support various neural networks and other artificial intelligence (AI) architectures, and sometimes is referred to as "supercomputers on wheels." With such hardware, the connected vehicles can estimate their current positions, plan routes through a road network, and predict their future destinations based on previous user/vehicle behaviors. In particular, connected electric vehicles are aware of available charging infrastructure, aware of their current state of charge (SoC), and if they are currently charging.

The connectivity component 207 can transmit message, data, and information generated by the vehicular computing system 151 to an external system or device such as the resource allocation system 170 and the user equipment 154 in the endpoint environment via one or more wireless network connections 152 (e.g., 5G high band). For instance, the one or more wireless network connections can satisfy one or more threshold criteria including a minimum network bandwidth, a minimum network latency, or a combination thereof for transmitting remote data to be processed by the computing resources 205 of the 5G-enabled vehicles 107 during the remote use by the user equipment, receiving information or data processed and generated by the resource allocation system 170, and so on.

The data storage resources 209 broadly encompass any magnetic, optical, or mechanical media that records and preserves digital information for ongoing or future operations. Examples of the data storage resources include volatile or non-volatile memory capable of performing the tasks remotely for the user equipment 154 upon request. Volatile memory may be a storage medium that requires power to maintain the state of data stored by the medium. Non-limiting examples of volatile memory may include various types of random-access memory (RAM), such as dynamic random-access memory (DRAM), or static random access memory (SRAM). In some examples, all or a portion of the data storage resources 209 may be integrated into the computing resources 205. The data storage resources 209 may store various software and data used during operation such as one or more applications, data operated on by the application(s), libraries, etc.

The power resources 211 include typical power supplying and managing components for the 5G-enabled vehicle (e.g., 5G-enabled electric vehicle). The power resources 211 may include a battery pack, a power inverter, an electric motor, an onboard battery charger, a battery management system. The battery management system of the power resources 211 may monitor the battery power level of the 5G-enabled vehicle 107 when the 5G-enabled vehicle 107 is using the computing and data storage resources to perform tasks remotely for the user equipment 154. Further, the battery management system of the power resources 211 may set a minimum threshold for the battery power as a protective mechanism. When the battery power level is below the minimum threshold, the allocation and utilization of the computing and data storage resources to perform the tasks remotely for the user equipment 154 is automatically ceased.

The resource controller 213 may communicate with the resource allocation system 170 via network 152 to allocate computing resources 205 (e.g., processing unit time) and/or data storage resources 209 of the 5G-enabled vehicles for utilization by the user equipment 154. The resource controller 213 may monitor usage of computing resources 205 and/or data storage resources 209 and also the specific applications and tasks that are using such resources and communicate such resource availability data in real-time or near real time to the resource allocation system 170. For example, the usage data may include data indicative of usage history of one or more processing units and/or storage devices of the 5G-enabled vehicle 107. Such usage data, usage statistics and other metadata associated with the usage (e.g., time of day, day of week, time of month, month of year, time of year, and geographic location of the 5G-enabled vehicles) may also be communicated to the resource allocation system 170.

The output component 215 may provide the output or result of the usage of the computing resources 205 and/or data storage resources 209 to the resource allocation system 170 to provide to the user equipment 154 that requested the available processing resources and/or communicate such processing resource use output directly to the user equipment 154 that requested the available resource. In some embodiments, the output component 215 can present a user interface on a device based on the processing availability of the 5G-enabled vehicle 107. For instance, the user interface can provide function(s) or other interface features to search/identify available computational resource(s) (e.g., CPUs, GPUs, etc.) and/or to reserve the computational resource for the remote use (e.g., an Artificial Intelligence-powered application) by the user equipment 154. In some embodiments, the data processing component 201 can then receive an input via the user interface indicating a demand for specific computational requirement (e.g., a particular model of CPU/GPU for a particular amount of time) associated with the remote use (e.g., a content delivery task) requested by the user equipment 154. In this case, the computing and data storage resources can be determined to be available further based on the computational requirement.

The security component 217 is configured to monitor the computing tasks (e.g., applications) executed on the 5G vehicle 107 utilizing the allocated computing resources. The security component 217 is operable to take security measures to protect the safety of the 5G-enabled vehicle 107. In some embodiments, the security component 217 is in a form of a security device that monitors and filters incoming and outgoing traffic based on previously established security policies. In some embodiments, the security component is in a form of a software application pre-installed on the vehicular computing system 151. The security component 217 may protect the identity of the 5G-enabled vehicle 107 providing the computing resources, monitor the communication between the 5G-enabled vehicle 107 and the external user equipment 154 to protect data safety, encrypt privacy data and prevent privacy leakage, detect a malicious event and take responsive measures against the malicious event. In some embodiments, a malicious event may be a malware such as adware, viruses, worms, trojans, bots, ransomware, spyware, etc., Generally the malware is designed to intentionally cause disruption to the vehicular computing system 151 or other components of the 5G-enabled vehicle 107, leak private information, gain unauthorized access to information, deprive the privilege of the 5G-enabled vehicle 107 to computing resources, or interfere with the security and privacy of the owner of 5G-enabled vehicle 107. In some embodiments, upon detecting a malicious event or a malware by the security component 217, the resource controller 213 may cease providing computing resources to the external user equipment 154, cease communication between the 5G-enabled vehicle 107 and the external user equipment 154, and/or terminate any access to the 5G-enabled vehicle 107 from the external user equipment 154. The security component 217 may perform other functions to protect the safety of the vehicular computing system 151 and other components of the 5G-enabled vehicle 107.

The resource allocation system 170 includes, among other components, a demand analysis component 231, a scheduler 233, an authentication component 235, a power monitoring component 237, an edge server locator 239, a connectivity component 241, an orchestration component 243, a communication component 245, and a security component 247.

The communication component 245 may present a user interface on a device based on a device to provide function(s) or other interface features to facilitate communication between the vehicular computing system 151 and the resource allocation system 170 as well as the communication between the resource allocation system 170 and the user equipment 154. For instance, the communication component 245 can receive a user request from the user equipment 154. The user request can include a demand for processing resources such as computing and data storage resources from a 5G-enabled vehicle 107 to remoted perform a task for the user of the user equipment 154. The communication component 245 can send an inquiry to the 5G-enabled vehicle 107 regarding the user request, receive feedback and data transmitted from the from the 5G-enabled vehicle 107, and/or send notification to the user equipment 154 to report a status or a change of status of the processing resources of the 5G-enabled vehicle 107.

The demand analysis component 231 uses the data received from the resource controller 213 of the 5G-enabled vehicle 107 as well as the data received from user request sent from the user equipment 154 to analyze and determine availability for allocation of the computing and data storage resources of the 5G-enabled vehicle 107 to facilitate meeting the demand of the user request for available and allocatable processing resources while also meeting the self-demand to perform primary tasks of the 5G-enabled vehicle 107 for its own benefit. For example, the demand analysis component 231 may determine a computing resource 205 of the 5G-enabled vehicle 107 is available for usage by the user equipment 154 to perform a task, based on a determination that a central processing unit (CPU) of the 5G-enabled vehicle 107 is idle and predicted to continue to be idle for a particular time period. The scheduler 233 of the resource allocation system 170 may then allocate the CPU of the 5G-enabled vehicle 107 for the user equipment and cause the 5G-enabled vehicle 107 to use the CPU to facilitate meeting the demand for available resources to perform the task for the user equipment, based on the determination. For example, this may be performed via time slice assignment by an operating system task scheduler of the resource controller 213 of the vehicular computing system 151 of the 5G-enabled vehicle 107 to remotely perform the task originating from the user equipment to execute program code associated with the task and/or store data.

For example, when the processing resources (e.g., CPU time) is needed to perform primary tasks of the 5G-enabled vehicle 107 for its own benefit, the resource controller 213 of the vehicular computing system 151 may then automatically send a request to the scheduler 233 of the resource allocation system 170 to cease using the CPU to perform the task for the user equipment 154 and to switch to using the CPU to perform the primary tasks of the 5G-enabled vehicle 107. For example, this may be performed via time slice assignment by an operating system task scheduler of the resource controller 213. In some embodiments, some or all of the functionality of scheduler 233 may be performed by the resource controller 213 or other component of the 5G-enabled vehicle 107.

The available and allocatable processing resources of the 5G-enabled vehicle 107 may be used for many different types of tasks of the user equipment including, but not limited to: video encoding, video decoding, audio encoding, audio decoding, graphics processing, graphics rendering, video analytics, computer vision, object recognition, location services, data caching, augmented reality computing, virtual reality computing, distributed computing tasks, video or audio storage, data storage, signal processing, system modeling, simulations, machine learning, software application tasks, computing tasks.

In some embodiments, the scheduler 233 may select a particular 5G-enabled vehicle from a plurality of idle 5G-enabled vehicles as the edge computing node to perform computing and/or provide storage to a particular user equipment requesting the processing resources, based on the geographic proximity of the 5G-enabled vehicle 107 to the particular user equipment 154 requesting the processing resources. For example, the scheduler 233 may select 5G-enabled vehicle 107*a* to provide computing and/or storage resources to the particular user equipment 154*a* requesting such resources because 5G-enabled vehicle 107*a* is the closest edge computing node geographically to the user equipment 154*a* and also has processing resource available to allocate. This may improve latency and reduces network congestion by avoiding adding network traffic over longer and more complex routes.

In various embodiments, the scheduler 233 may cause the selected 5G-enabled vehicle 107 to perform the task in response to the user request from the user equipment 154, based on one or more of: geographic location of the user equipment 154 from which the demand for processing resources originated; urgency of the demand for resources; priority of the demand for resources; time of day of the demand for resources; maximum latency requirements associated with the demand for resources; a level of the determined availability of the respective processing resource at the selected 5G-enabled vehicle; an account associated with the user equipment from which the demand for resources originated; type of data associated with the demand for resources; and predicted availability of the selected 5G-enabled vehicle.

Such usage data, usage statistics, and other metadata associated with the usage (e.g., time of day, day of week, time of month, month of year, time of year, and geographic location of the 5G-enabled vehicle) may also be communicated as training data to an artificial intelligence or machine learning component (not shown) of the scheduler 233. The scheduler 233 may predict availability for allocation of resources of the 5G-enabled vehicle using a machine learning component that learns to predict the availability based on the usage history to facilitate meeting demand of the user equipment 154. The scheduler 233 may then allocate the available processing resources of the 5G-enabled vehicle 107 and cause the 5G-enabled vehicle 107 to automatically use the allocated processing resources to facilitate meeting demand of the user equipment 154 based on the prediction. For example, the scheduler 233 may learn that the 5G-enabled vehicle 107 is largely idle during certain times of day in a designated location and schedule processing resources of the 5G-enabled vehicle 107 for remote use by the user equipment 154 during those times of day.

In some embodiments, the scheduler 233 may determine that a respective processing resource at the 5G-enabled vehicle 107 is no longer currently available to perform the task requested by the user equipment 154 in addition to that which is used by the respective processing resource at the 5G-enabled vehicle 107 to perform the primary tasks by the 5G-enabled vehicle 107 for its own benefit. For example, the resource controller 213 or the scheduler 233 may determine that a current level of processing resources demanded by the user equipment 154 is not able to be met if the respective processing resource at the 5G-enabled vehicle **107*a* continues to perform the task remotely for the user equipment 154, in addition to that which is used by the respective processing resource at the 5G-enabled vehicle 107*a* to provide the level of telecommunications service (e.g., the primary tasks) by the 5G-enabled vehicle 107*a* for its own benefit. In response to or otherwise based on this determination, the scheduler 233 may select an additional and different 5G-enabled vehicle 107 (e.g., 5G-enabled vehicle 107*b*), which has been determined to have available processing resources to perform the task requested by the user equipment 154 in addition to that which is used by the respective processing resource at the 5G-enabled vehicle 107*a* that is no longer currently available. The scheduler 233 may then send a resource allocation command to the additional 5G-enabled vehicle 107*b* causing the additional 5G-enabled vehicle 107*b* to use the processing resources thereof to remotely perform the task requested by the user equipment. For example, this may be performed via time slice assignment by an operating system task scheduler of the resource controller 213 of the vehicular computing system 151 of the 5G-enabled vehicle 107*b*. In some embodiments, the scheduler 233 may immediately transition such use of available processing resources over to the additional 5G-enabled vehicle 107*b*** to reduce or eliminate the perceived interruption in service to the user equipment requesting such service.

The scheduler 233 may include and maintain a database of 5G-enabled vehicles as the edge computing nodes, including 5G-enabled vehicles and the associated current and predicted availability of individual resources at each 5G-enabled vehicle for allocation to remote endpoint user equipment or user devices. In some embodiments, the scheduler 233 may respond to requests from a user equipment for processing resources built around the on-demand software-as-a-service (SaaS), platform-as-a-service (PaaS) and infrastructure-as-a-service (IaaS) delivery models, as well as to requests from clients for processing resources that are not on-demand, such as large computing tasks that do not have real-time or mission critical requirements. The scheduler 233 responds to such requests by selecting available 5G-enabled vehicles and associates resources based on the database of 5G-enabled vehicles and the associated current and predicted availability of individual processing resources at each 5G-enabled vehicles for allocation to the user equipment. The scheduler 233 may also distribute a computing task for a particular user equipment and/or data storage across multiple interconnected 5G-enabled vehicles in a mesh network (e.g., the mesh network 182 shown in FIG. 1C), including multiple data centers as processing resources become available at particular 5G-enabled vehicles. The scheduler 233 may dynamically add more 5G-enabled vehicles to those already providing processing resources as they are needed to meet demand for such resource increases. The scheduler 233 may dynamically remove 5G-enabled vehicles from those already providing processing resources as they are no longer needed to meet demand for such resource decreases.

The authentication component 235 can perform user authentication to authorize the user of the user equipment to access and use the processing resources of the 5G-enabled vehicles that are idle and available. Further, the authentication component 235 can also determine the eligibility of the user equipment sending the user request, based on pre-established rules, associated user account, user credential information, and so on. The power monitoring component 237 can receive information about the battery power level of the 5G-enabled vehicle 107 and monitor the status of the battery power level based on the received information. As mentioned above, when the battery power level of the 5G-enabled vehicle 107 is below a pre-established minimum threshold level, the power monitoring component 237 will notify the scheduler 233 that the 5G-enabled vehicle is no longer available as an edge computing node to perform or continue to perform the task requested by the user equipment.

The edge server locator 239 can receive data regarding the location of the 5G-enabled vehicles from vehicular computing system 151 of each 5G-enabled vehicle 107, determine the location of the user equipment 154 sending the user request for processing resources of 5G-enabled vehicles, and determine a distance between the user equipment 154 and each of the each 5G-enabled vehicles. The edge server locator 239 can then determine which 5G-enabled vehicles are in proximity to the user equipment 154 sending the user request, based on the determined distance. The edge server locator 239 may further prioritize the 5G-enabled vehicles that are within the acceptable range of the user equipment sending the user request and identify the 5G-enabled vehicle(s) that is the best candidate in the proximity to the user equipment 154.

The connectivity component 241 can transmit message, data, and information generated by the resource allocation system 170 to an external system or device such as the vehicular computing system 151 and the user equipment 154 in the endpoint environment via one or more wireless network connections 152 (e.g., 5G high band). For instance, the one or more wireless network connections can satisfy one or more threshold criteria including a minimum network bandwidth, a minimum network latency, or a combination thereof for transmitting remote data to be processed by the computing resources 205 of the 5G-enabled vehicles 107 during the remote use by the user equipment 154, receiving information or data processed and generated by the vehicular computing system 151, and so on.

The orchestration component 243 may orchestrate, configure, and coordinate multiple identified 5G-enabled vehicles to generate a mesh network (e.g., the mesh network 182 of FIG. 1C) containing the identified 5G-enabled vehicles, each serving as an edge computing node of the mesh network. As described above, processing resources from each of the edge computing nodes may be distributed in the mesh network to maximize the efficiency of resource allocation to the user equipment 154.

Similar to the security component 217 of the 5G-enabled vehicle 107, the security component 247 of the resource allocation system 170 may also provide another layer of protection in addition to user authentication. The security component 247 may monitor the computing task detect a malicious event caused by the external user equipment 154 and/or the computing task to be executed on the 5G-enabled vehicle 107 using the computing resources thereof. Upon detecting a malicious event or determining presence of a risk to the safety of the 5G-enabled vehicle 107, the security component 247 may be operable to instruct the resource allocation system 170 to cease allocating the computing resources of the 5G-enabled vehicle 107, block the access of the external user equipment 154 to the 5G-enabled vehicle 107, and/or take additional security measures.

Figure 3:
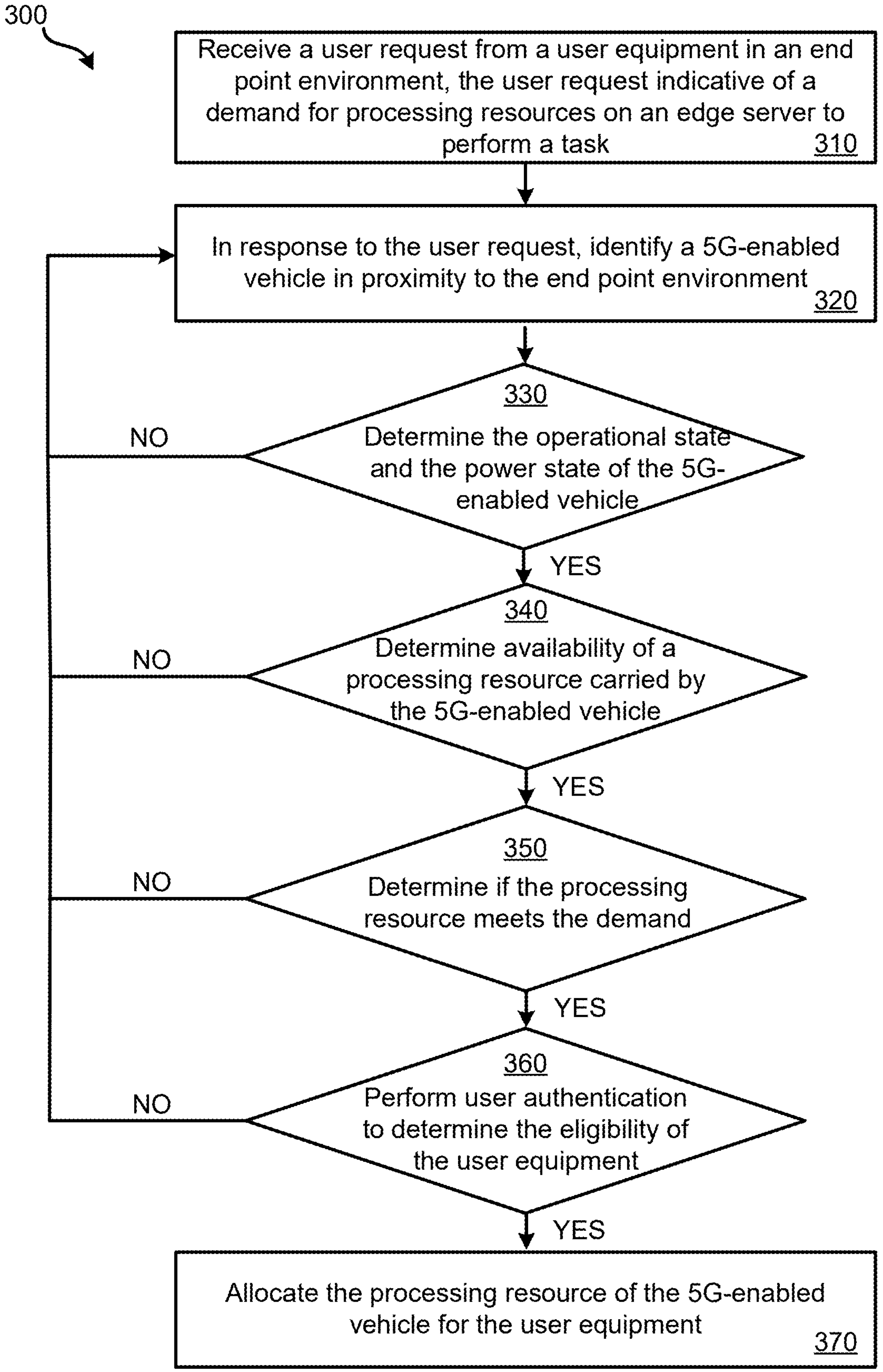
FIG. 3 is a flow diagram illustrating an example method for allocating processing resource of a 5G-enabled vehicle as an edge server, according to various embodiments.

FIG. 3 is a flow diagram illustrating an example method 300 for allocating processing resource of a 5G-enabled vehicle, according to various embodiments of the present disclosure. At 310, a user request sent from a user equipment in an endpoint environment is received, by a resource allocation system described herein. The user request contains a demand for available processing resource of an edge server to remotely perform a task for the user device at an edge location in proximity to the user equipment.

At 320, one or more 5G-enabled vehicles are identified, by the resource allocation system, in response to the user request sent by the user equipment. In some embodiments, a location of the user equipment as well as the location of the identified 5G-enabled vehicle are respectively determined. A distance between the user equipment requesting the processing resource and the identified 5G-enabled vehicle is calculated. The distance is compared against a reference to determine if the identified 5G-enabled vehicle is within an accessible range by the user equipment. If the identified 5G-enabled vehicle is within the accessible range, it is determined to be in proximity to the user equipment.

At 330, data and information regarding an operational state and a power state of the identified 5G-enabled vehicle is received by the resource allocation system, and a determination is made by the resource allocation system on availability of the identified 5G-enabled vehicle, based on the determination of the operational state and the power state of the identified 5G-enabled vehicle, as well as the processing resource demanded by the user equipment. In some embodiments, the operational state of the 5G-enabled vehicle indicates if the 5G-enabled vehicle is currently idle and not in operation. The operational state of the 5G-enabled vehicle may also indicate the time duration of the idle state of the 5G-enabled vehicle, based on a planned schedule (e.g., a schedule indicating that the 5G-enabled vehicle will be in operation in 1 hour, etc.). The power state of the 5G-enabled vehicle may include information about the current battery power level of the of the 5G-enabled vehicle, and/or if the 5G-enabled vehicle is currently under charging, etc. The power state of the 5G-enabled vehicle may also indicate the estimated time duration (e.g., 30 minutes) of maintaining the battery power level above a minimum threshold level (e.g., 25% of the total battery energy capacity). If the identified 5G-enabled vehicle is determined to be available, the method 300 proceeds to 340, otherwise the method 300 proceeds to 320.

At 340, a determination is made, by the resource allocation system, on the availability of a processing resource carried by the identified 5G-enabled vehicle for allocation and use for the user equipment. In some embodiments, a determination is made on if the processing resource carried by the identified 5G-enabled vehicle is currently being used or has been reserved to perform primary tasks for the benefit of the 5G-enabled vehicle itself. In some embodiments, a determination is made on if the processing resources to be allocated for the user equipment will affect or jeopardize the primary tasks of the 5G-enabled vehicle itself. In some embodiments, a determination is made on if the processing resources to be allocated for the user equipment will drain the battery power of the 5G-enabled vehicle and cause the battery power level to be below a minimum threshold level indicating an unhealthy power state. In some embodiments, a determination is made on if the processing resource to be allocated for the user equipment will potentially cause safety issues to the 5G-enabled vehicle (e.g., overheated CPU, abnormal memory capacity, etc.). If the processing resource carried by identified 5G-enabled vehicle is determined to be available for allocation, the method 300 proceeds to 350, otherwise the method 300 proceeds to 320.

At 350, a determination is made, by the resource allocation system, on if the processing resource carried by the 5G-enabled vehicle meets the demand by the user equipment. In some embodiments, the type (e.g., CPU, GPU, memory, storage device, etc.), strength (e.g., processing speed of the CPU, memory size, etc.), and amount (e.g., time duration) of the processing resource demanded by the user equipment for performing the task requested by the user equipment are analyzed and compared with the type, strength, and amount of the processing resource carried by the identified 5G-enabled vehicle. If the processing resource carried by identified 5G-enabled vehicle is determined to meet the demand of the user equipment, the method 300 proceeds to 360, otherwise the method 300 proceeds to 320.

At 360, user authentication is performed, by the resource allocation system, to determine if the user of the user equipment is authorized to access the processing resources carried by the 5G-enabled vehicle and/or if the user equipment is eligible to use the processing resources carried by the 5G-enabled vehicle. If the user authentication generates a positive outcome (e.g., the user is authenticated and the user equipment is eligible), the method 300 proceeds to 370, otherwise the method 300 proceeds to 320.

At 370, the processing resources of the 5G-enabled vehicle is allocated, by the resource allocation system, for the user equipment. In some embodiments, a command with an instruction is sent to the 5G-enabled vehicle to cause the 5G-enabled vehicle to use the processing resource to remotely perform the task requested by the user equipment.

More examples of the processing resources allocation are described below with references to FIGS. 4A-4B and FIGS. 5-6.

Figure 4A:
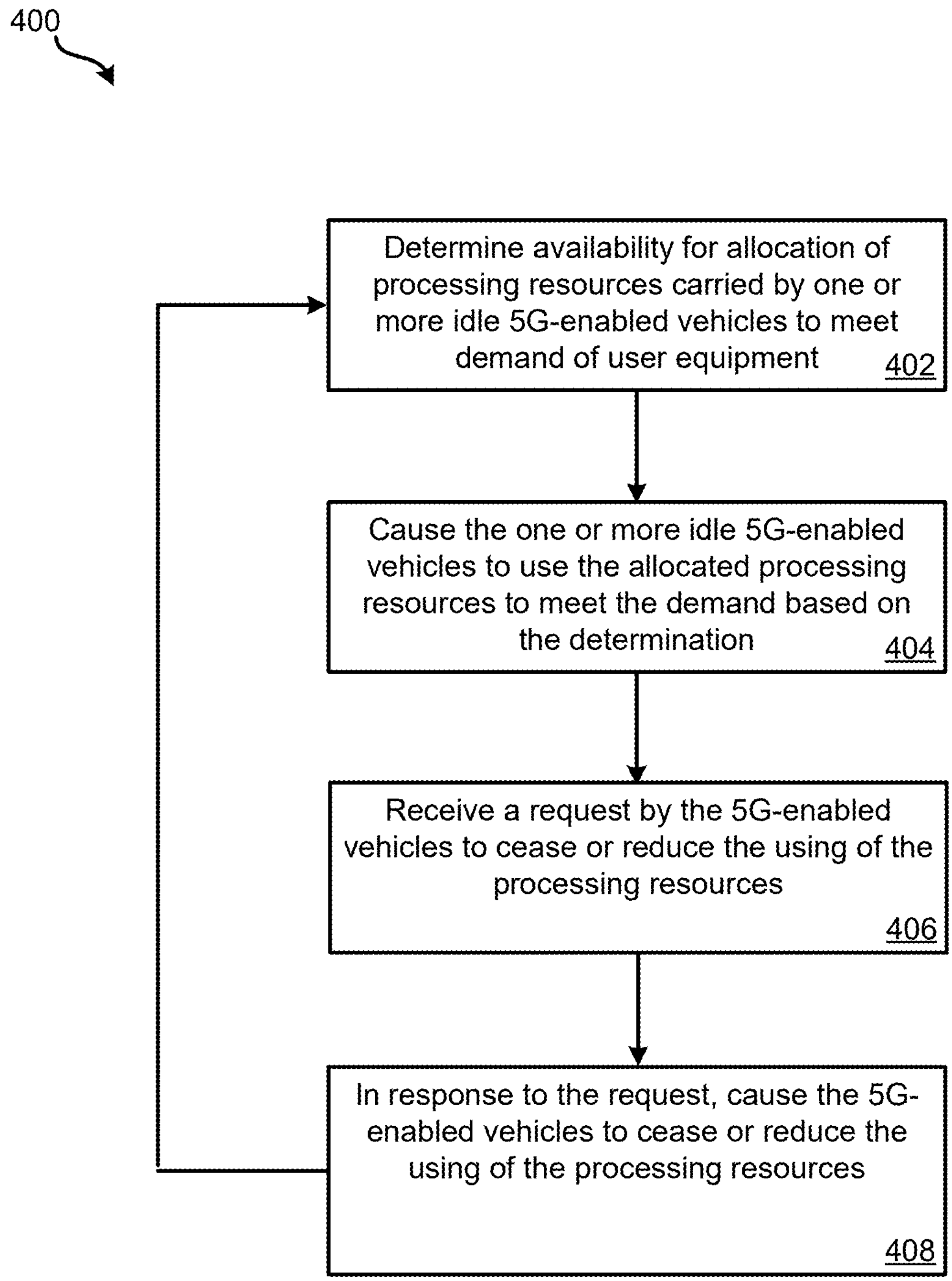
FIG. 4A is a flow diagram of an example process of allocating processing resources of a 5G-enabled vehicle, according to various embodiments.

FIG. 4A is a flow diagram of an example process 400 of allocating processing resources of a 5G-enabled vehicle, according to various embodiments of the present disclosure. At 402, a determination is made, by a communications system described herein, on the availability for allocation of processing resource carried by one or more 5G-enabled vehicles, in response to a user request for the processing resource by a user equipment. In some embodiment, the determination is made on the availability for allocation of resources of one or more 5G-enabled vehicles as edge server (also referred to as an "edge computing node") to facilitate meeting demand from a user equipment of an endpoint environment in proximity to the edge server for additional processing resources while also meeting demand to perform primary tasks for the own benefit of the one or more 5G-enabled vehicles. For example, the determination of availability for allocation of resources of the one or more 5G-enabled vehicles may include determining that a processing resource of a 5G-enabled vehicle is available based on a determination that a CPU of the one or more 5G-enabled vehicles is idle and predicted to continue to be idle for a particular time period.

At 404, in response to the determination that the processing resource of the one or more 5G-enabled vehicles is available, the processing resource is allocated by the communications system for the user equipment, and the one or more 5G-enabled vehicles are caused, by the communications system, to automatically use the available processing resources of the one or more 5G-enabled vehicles to facilitate meeting the demand for additional processing resource by the user equipment based on the determination.

At 406, a request sent from the one or more 5G-enabled vehicle is received, by the communications system, to cease or reduce the using of the processing resources for the benefit of the user equipment. The request may be generated by the vehicular computing system of the 5G-enabled vehicle, based on an indication that the processing resources currently used by the user equipment will not be available. Examples of such indication may include a determination that the 5G-enabled vehicle is no longer in an idle state, a determination that the battery power level of 5G-enabled vehicle is below a minimum threshold level, a determination that the processing resources currently used by the user equipment will be needed to satisfy the demand for increased resources to perform the primary tasks of the 5G-enabled vehicles, and so on.

At 408, the communications system causes the one or more 5G-enabled vehicles to cease or reduce the use of the allocated processing resources currently being used for meeting the demand for additional processing resources by the user equipment. In some embodiments, the allocated processing resources are retracted back in order to meet the demand to perform the primary tasks of the one or more 5G-enabled vehicles. In some embodiments, the allocated processing resource of the one or more 5G-enabled vehicles used to facilitate meeting the demand for additional resources by the user equipment includes processing unit time. Also, the allocated processing resources of the one or more 5G-enabled vehicles used to facilitate meeting the demand for additional resources by the user equipment may include data storage.

Figure 4B:
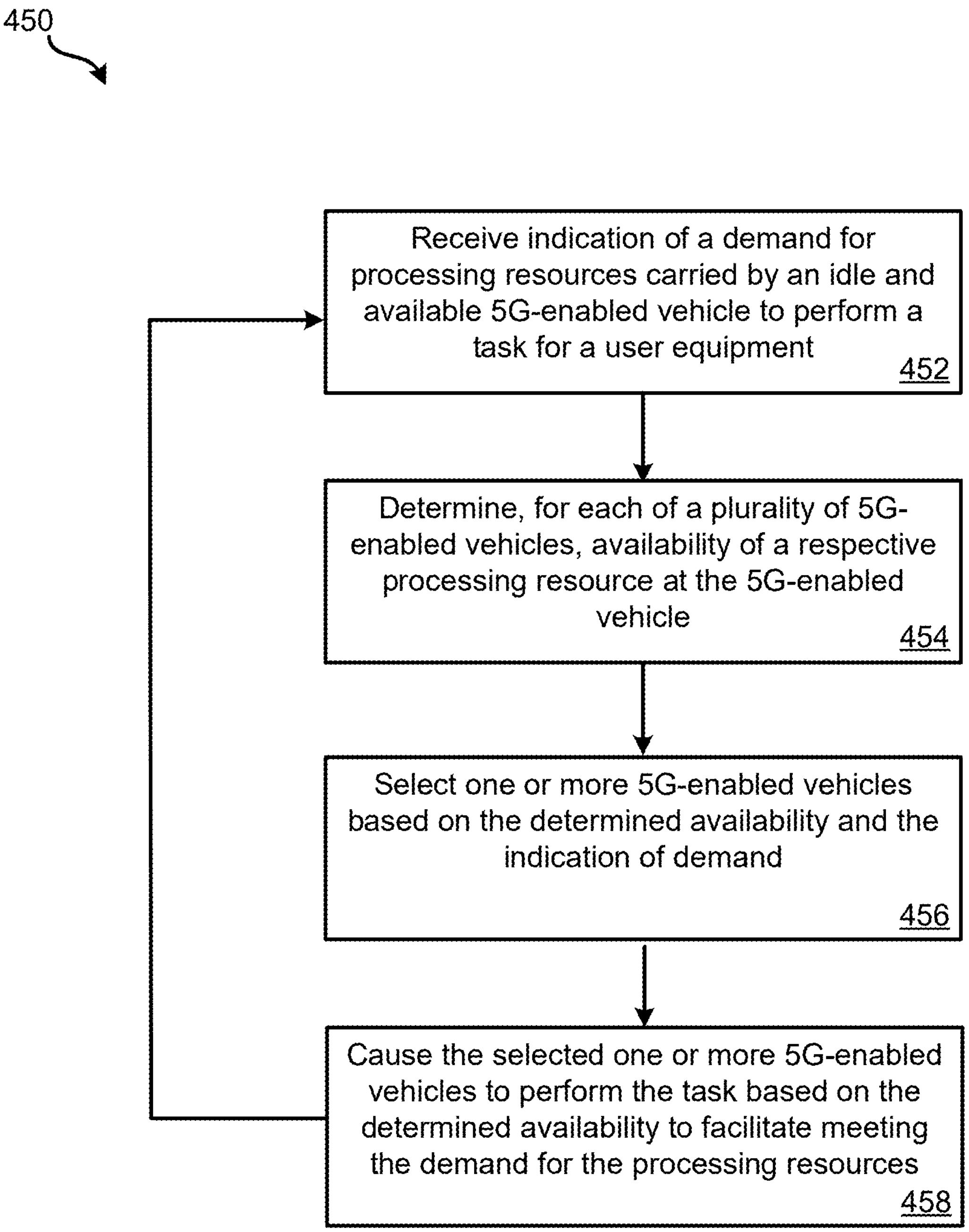
FIG. 4B is a flow diagram illustrating an example process of selecting and using 5G-enabled vehicles in allocating and utilizing processing resources, according to various embodiments.

FIG. 4B is a flow diagram illustrating an example process 450 of selecting and using 5G-enabled vehicles in allocating and utilizing processing resources, according to various embodiments of the present disclosure. At 452, an indication is received by a communication system described herein, the indicating containing a demand by a user equipment for processing resources carried by an idle and available 5G-enabled vehicle to perform a task for the benefit of the user equipment.

At 454, a determination is made, by the communication system, on the availability of a respective processing resource at the 5G-enabled vehicle, for each of a plurality of 5G-enabled vehicles. In some embodiments, a determination is made, for each of a plurality of 5G-enabled vehicles, availability of a respective computing resource at each of the 5G-enabled vehicles to perform the task for the benefit of the user equipment, in addition to that which is used by the respective processing resource at the 5G-enabled vehicle to perform primary tasks for the own benefit of the selected 5G-enabled vehicle.

At 456, one or more 5G-enabled vehicles are selected, based on the determined availability of the respective processing resource at the 5G-enabled vehicle as well as the indication of demand by the user equipment. In some embodiment, a determination is made on whether the total or accumulation of the respective processing resource of each of the plurality of 5G-enabled vehicles satisfies the demand for the user equipment.

At 458, the communications system causes, for each selected 5G-enabled vehicle of the plurality of one or more 5G-enabled vehicles, the selected 5G-enabled vehicle to perform the task by the respective processing resource at the selected 5G-enabled vehicle, to utilize the respective processing resource to facilitate meeting the demand for processing resources by the user equipment, based on the determined availability of the respective processing resource carried by the selected 5G-enabled vehicle. This utilization of the respective processing resource carried by the selected 5G-enabled vehicle is in addition to that which is used by the respective processing resource at each of the selected 5G-enabled vehicle to perform primary tasks for the own benefit of the respective selected 5G-enabled vehicle.

In various embodiments, the communications system may cause the selected 5G-enabled vehicle to perform the task for the benefit of the user equipment, based on one or more of: geographic location of the user equipment (or the distance between the selected 5G-enabled vehicle and the user equipment) from which the demand for resources originated; urgency of the demand for processing resources; priority of the demand for resources; time of day of the demand for resources; maximum latency requirements associated with the demand for resources; a level of the determined availability of the respective processing resource at the 5G-enabled vehicle; an account associated with user equipment or an application service executed on the user equipment from which the demand for resources originated; type of data associated with the demand for processing resources; and predicted availability of the selected 5G-enabled vehicle. For example, higher priority may be given to particular user equipment associated with particular requestors based on a number of different criteria, including but not limited to: type of processing resource requested; type of service requested; type of the task to be performed for the benefit of the user equipment; geographic location of user equipment requesting resources; proximity of device requesting resources to a particular 5G-enabled vehicle; type of data to be stored; predicated availability of particular processing resources at a selected 5G-enabled vehicle; time of hour, day, week, month and/or year of request for resources; frequency of such requests for processing resources; amount of payment provided for and/or user subscription or paid account status associated with requested resources; deadlines associated with tasks and/or resource usage; and whether tasks have real-time or mission-critical requirements.

Figure 5:
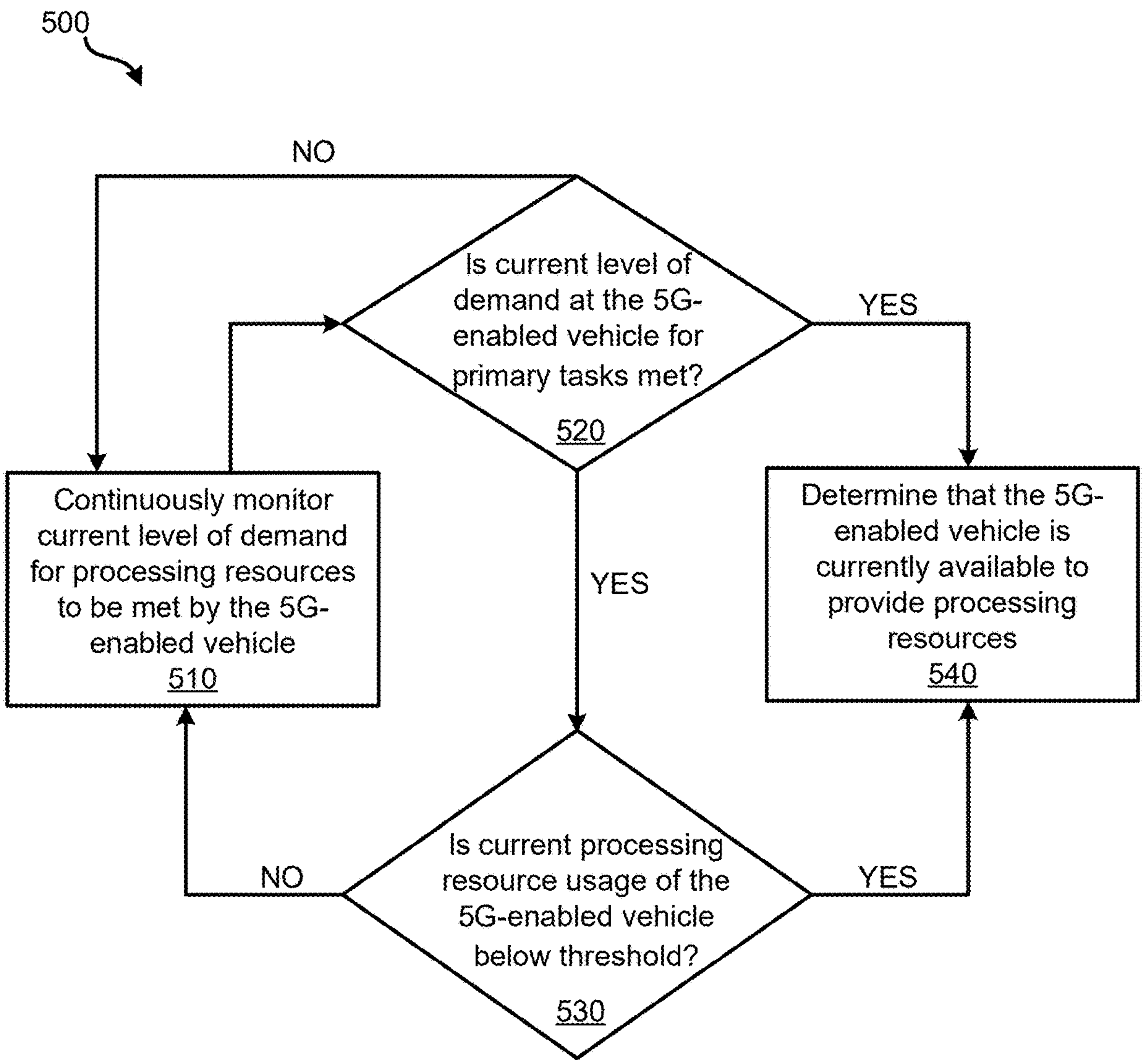
FIG. 5 is a flow diagram illustrating an example process of determining whether a 5G-enabled vehicle is available to serve as an edge server, according to various embodiments.

FIG. 5 is a flow diagram illustrating an example process 500 of determining whether 5G-enabled vehicles are currently available to serve as an edge server and provide user equipment with processing resources, according to various embodiments of the present disclosure.

At 510, a communications system described herein continuously monitors a current level of demand for processing resources to be met by an identified 5G-enabled vehicle for its own benefit. The 5G-enabled vehicle is in proximity to a user equipment in an endpoint environment. A user request is sent from the user equipment, and the user request indicates a demand for performing a task using the processing resources carried by the 5G-enabled vehicle as an edge server for the benefit of the user equipment. In various embodiments, a monitoring check may be based on time slice assignment by an operating system task scheduler of the resource controller 213 of the 5G-enabled vehicle 107. The monitoring may occur every processor clock cycle, or occur at some other frequency such as every nanosecond, millisecond, second, minute, number of minutes, hour, etc.

At 520, a determination is made, by the communications system, on whether the current level of demand for processing resources is being met by the identified 5G-enabled vehicle to perform primary tasks for the 5G-enabled vehicle for its own benefit. This may occur, for example, in conjunction with and as frequently as the monitoring of the current level demand to be met by the identified 5G-enabled vehicle. If it is determined the current level of demand is not being met by the identified 5G-enabled vehicle, the process proceeds to 510 to continue the monitoring without determining whether the respective processing resource at the identified 5G-enabled vehicle is currently available to be allocated for the user equipment. If it is determined the current level of demand is being met by the identified 5G-enabled vehicle, the process proceeds to 530.

At 530, a determination is made, by the communications system, on whether a current respective processing resource usage at the identified 5G-enabled vehicle is below a threshold. This may occur, for example, in conjunction with and as frequently as the monitoring of the current level of demand to be met by the identified 5G-enabled vehicle. If it is determined the current respective processing resource usage at the identified 5G-enabled vehicle is not below the threshold, then the process proceeds to 510 to continue the monitoring without determining the respective processing resource at the identified 5G-enabled vehicle is currently available to be allocated for the user equipment. The threshold may be selectable and set to a specific level. For example, the threshold may be set such that the respective processing resource at the identified 5G-enabled vehicle is only determined to be available to be allocated for the user equipment when the CPU of the identified 5G-enabled vehicle is considered idle, or below a particular selected percentage of usage (e.g., 25% of the total CPU usage). If it is determined the current respective processing resource usage at the identified 5G-enabled vehicle is not below the threshold, then the process proceeds to 540.

At 540, a determination is made, by the communications system, on whether the respective processing resource at the identified 5G-enabled vehicle is currently available to be allocated for the user device to perform the task for the benefit of the user equipment, in addition to that which is used by the respective processing resource to perform the primary tasks for the benefit of the identified 5G-enabled vehicle. For example, this may be based on a determination at 520 that the current level of demand is being met by the identified 5G-enabled vehicle and a determination at 530 that the respective processing resource at the identified 5G-enabled vehicle is not at full capacity (or otherwise has usage below a selected threshold).

Figure 6A:
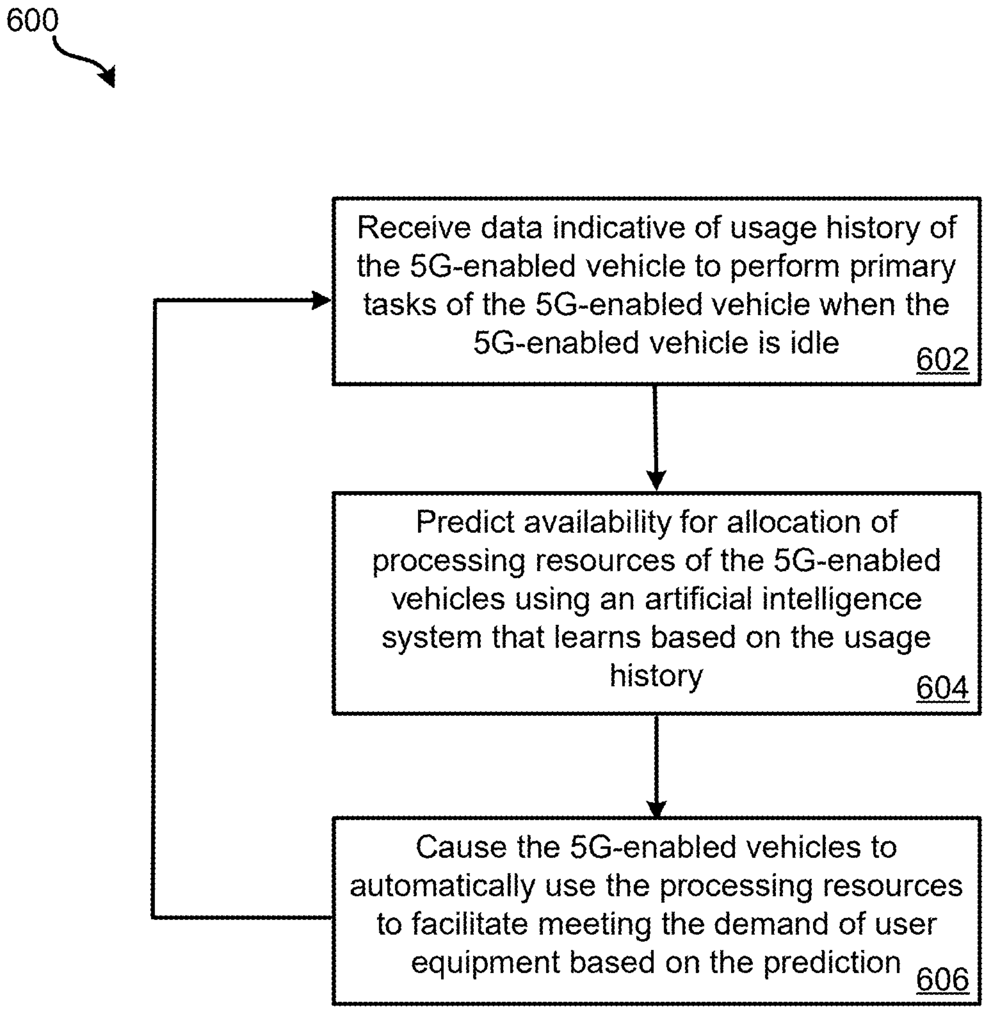
FIG. 6A is a flow diagram illustrating an example process of causing a 5G-enabled vehicle to serve as an edge server for a user equipment, according to various embodiments.

FIG. 6A is a flow diagram illustrating an example process 600 of causing a 5G-enabled vehicle to serve as an edge server for a user equipment in demand of processing resources and provide the user equipment with the processing resource, based on a prediction by a machine learning model, according to various embodiments of the present disclosure. At 602, data is received by a communications system described herein, the data indicative of the usage history of one or more 5G-enabled vehicles to perform the primary tasks for the benefit of the one or more 5G-enabled vehicles when the one or more 5G-enabled vehicles are idle and in proximity to an endpoint user equipment or user device.

At 604, a prediction is made, by the communication system, on the availability for allocation of resources of the one or more 5G-enabled vehicles using a machine learning model that learns to predict the availability based on the usage history to facilitate meeting the demand of the user equipment. For example, this may be performed by a neural network having nodes that represent each of the one or more 5G-enabled vehicles.

At 606, the communications system allocates the available processing resources of the one or more 5G-enabled vehicles and causes the one or more 5G-enabled vehicles to automatically use the processing resources of the one or more 5G-enabled vehicles to facilitate meeting the demand of the user equipment, based on the prediction using the machine learning model.

Figure 6B:
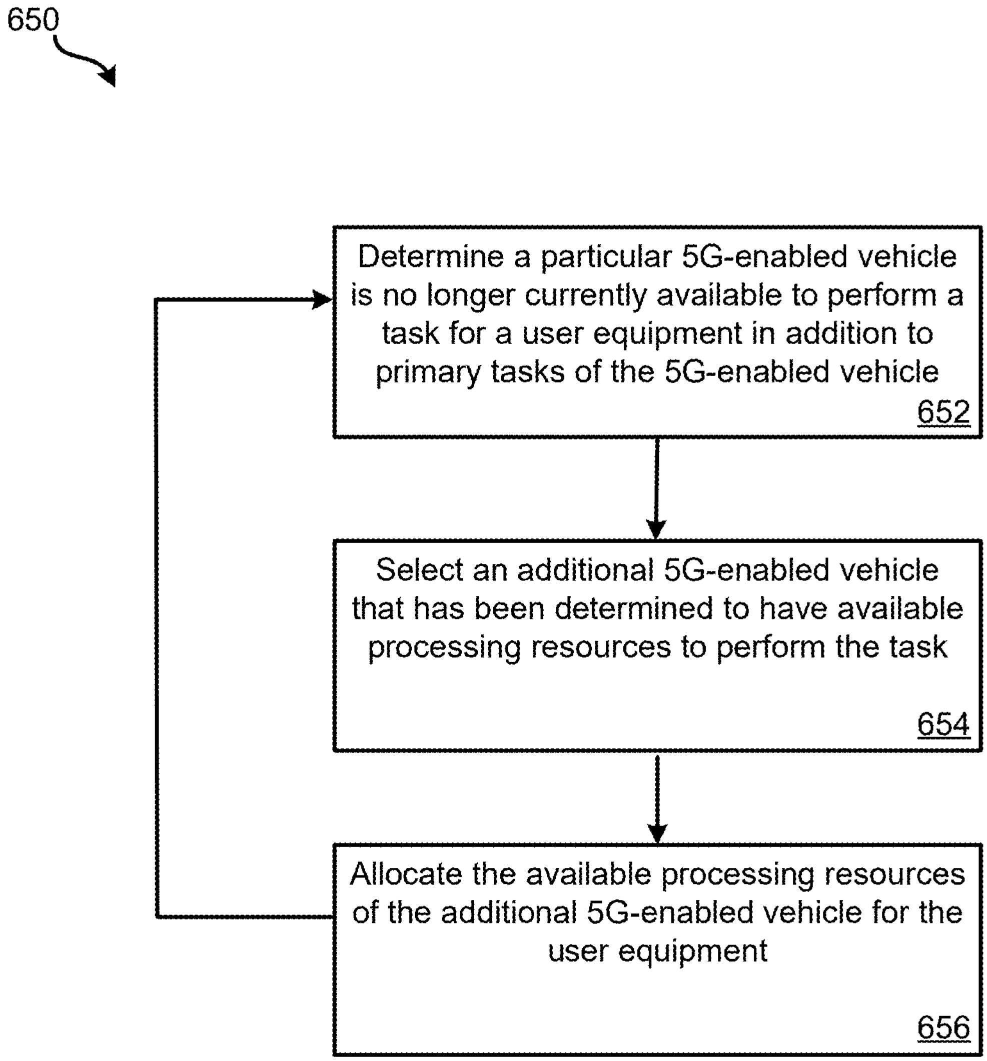
FIG. 6B is a flow diagram illustrating an example process of selecting additional 5G-enabled vehicles for allocating additional processing resources, according to various embodiments.

FIG. 6B is a flow diagram illustrating an example process 650 of selecting additional 5G-enabled vehicles for allocating additional processing resources for the benefit of user equipment, according to various embodiments of the present disclosure. At 652, a determination is made, by a communication system described herein, that a respective processing resource at a particular 5G-enabled vehicle of a plurality of 5G-enabled vehicles is no longer currently available to be allocated for and used by the user equipment, in addition to that which is used by the particular 5G-enabled vehicle to perform primary tasks by the particular 5G-enabled vehicle for its own benefit. This may be based on a determination that a current level of demand for processing resources is not able to be met if the respective processing resource at the particular 5G-enabled vehicle continues to be allocated and used by the user equipment in addition to that which is used by the particular 5G-enabled vehicle to perform the primary tasks for its own benefit.

At 654, an additional 5G-enabled vehicle of the plurality of 5G-enabled vehicles is selected, by the communications system, based on a determination that the additional processing resources of the plurality of 5G-enabled vehicles have available processing resources to be allocated for and used by the user equipment, in addition to that which is used by the particular of the plurality of 5G-enabled vehicles that is no longer currently available.

At 656, the communications system allocates the available processing resources of the additional 5G-enabled vehicle and causes the additional 5G-enabled vehicle of the plurality of 5G-enabled vehicles to perform the task for the user equipment, in addition to that which is used by the particular 5G-enabled vehicle that is no longer currently available.

Figure 6C:
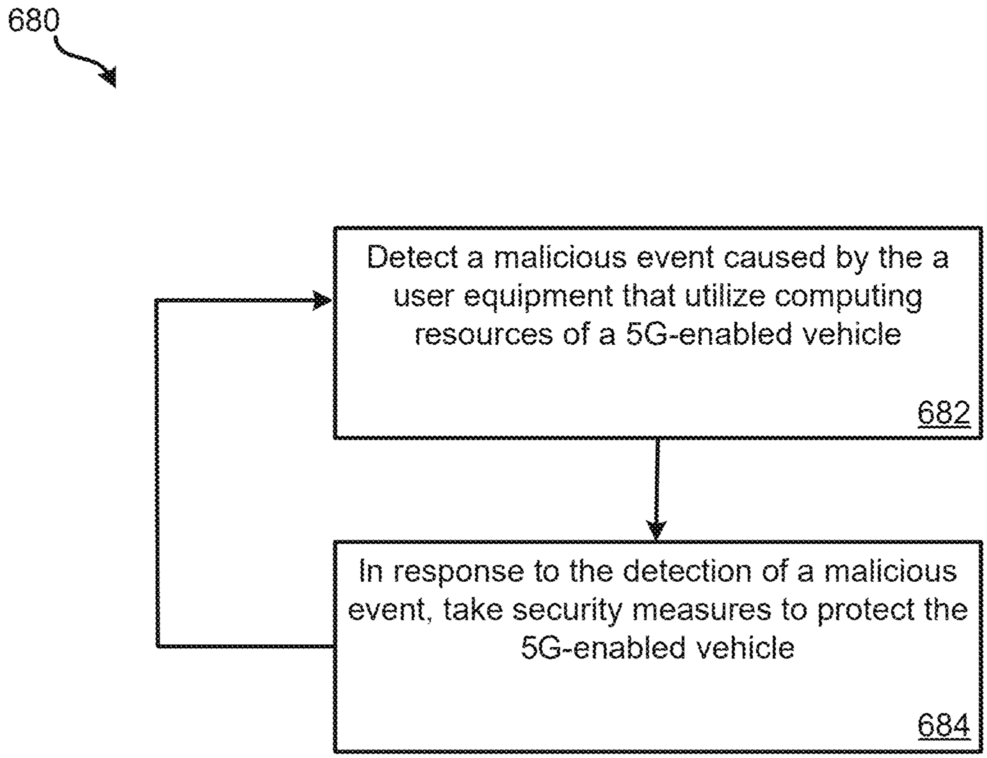
FIG. 6C is a flow diagram illustrating an example process of protecting safety of a 5G-enabled vehicle, according to various embodiments.

FIG. 6C is a flow diagram illustrating an example process 680 of protecting the 5G-enabled vehicle, according to various embodiments of the present disclosure. It is noted that the process 680 may be used in combination with any one or more of other methods described herein. At 682, the computing task performed by the 5G-enabled vehicle utilizing the computing resources of the 5G-enabled vehicle is monitored, by the security component 217 or the security component 247, to detect a malicious event that intentionally causes harm to the 5G-enabled vehicle. At 684, in response to the detection of a malicious event, security measures are taken, by the vehicular computing system 151 or the resource allocation system 170, to protect the 5G-enabled vehicle. In some embodiments, the safety measures include at least one of the following: ceasing allocation of the computing resources of the 5G-enabled vehicle, ceasing providing computing resources to the user equipment, ceasing communication between the 5G-enabled vehicle and the user equipment, terminating/blocking any access to the 5G-enabled vehicle from the user equipment.

Figure 7:
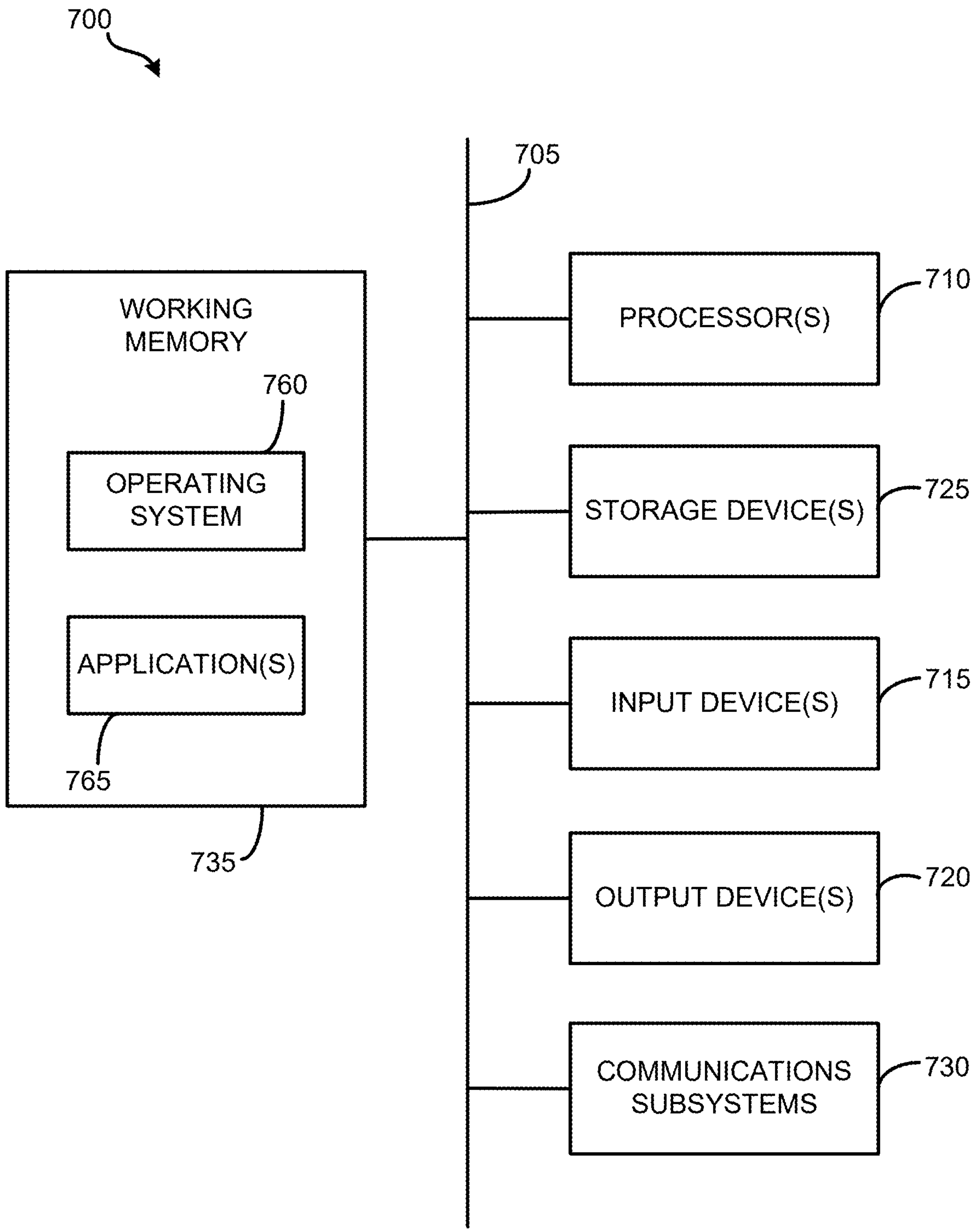
FIG. 7 is a schematic diagram illustrating an embodiment of a computer system, according to various embodiments.

FIG. 7 is a schematic diagram illustrating an example of computer system 700. The computer system 700 is a simplified computer system that can be used to implement various embodiments described and illustrated herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method, comprising:

receiving a request from a user equipment (UE) in an endpoint environment, the request indicating a demand for processing resources on an edge server to perform a computing task for the UE;

in response to the request, identifying a first 5G-enabled vehicle in proximity to the endpoint environment;

determining an operational state and a power state of the first 5G-enabled vehicle, wherein determining the power state comprises determining a current battery power level of the first 5G-enabled vehicle;

in response to determining that the operational state is idle and that the current battery power level is above a predetermined threshold, determining availability of a first processing resource carried by the first 5G-enabled vehicle;

in response to determining that the first 5G-enabled vehicle carries the first processing resource that is available, determining whether the first processing resource carried by the first 5G-enabled vehicle meets the demand of the user equipment; and in response to determining that the first processing resource meets the demand of the user equipment, allocating the first processing resource carried by the first 5G-enabled vehicle and causing the first 5G-enabled vehicle to serve as an edge server to perform the computing task for the user equipment using the allocated first processing resource.

2. The method according to claim 1, further comprising: performing user authentication to authenticate the user of the user equipment to use the first processing resource of the first 5G-enabled vehicles and verify that the user equipment is eligible to use the first processing resource.

3. The method according to claim 1, wherein the determining availability of a first processing resource carried by the first 5G-enabled vehicle further comprises:

determining that a central processing unit (CPU) of the first 5G-enabled vehicle is idle and predicted to continue to be idle for a particular time period; and determining that the CPU is included in the first processing resource to be allocated for and used by the user equipment for the particular time period.

4. The method according to claim 1, wherein the determining availability of a first processing resource carried by the first 5G-enabled vehicle further comprises:

determining whether a current level of processing resources carried by the first 5G-enabled vehicle meets both the demand by the user equipment and a self-demand by the first 5G-enabled vehicle; and in response to determining that the current level of processing resources carried by the first 5G-enabled vehicle meets both the demand by the user equipment and a self-demand by the first 5G-enabled vehicle, determining that the processing resource requested by the user equipment is available.

5. The method according to claim 1, wherein the determining availability of a first processing resource carried by the first 5G-enabled vehicle further comprises:

determining whether a current usage of processing resource by the first 5G-enabled vehicle to perform primary tasks for the 5G-enabled vehicle is below a pre-established threshold level; and in response to determining that the current usage of processing resource is below the pre-established threshold level, determining that the first processing resource carried by the 5G-enabled vehicle is available.

6. The method according to claim 1, further comprising:

receiving a request by the first 5G-enabled vehicle to cease the using of the allocated first processing resource; and in response to the request, causing the first 5G-enabled vehicle to cease the use of the first processing resource.

7. The method according to claim 6, further comprising:

identifying a second 5G-enabled vehicle in proximity to the endpoint environment;

determining that the second 5G-enabled vehicle carries a second processing resource that is available and meets the demand of the user equipment; and allocating the second processing resource carried by the second 5G-enabled vehicle and causing the second 5G-enabled vehicle to serve as a second edge server to continue performing the computing task for the user equipment using the allocated second processing resource.

8. The method according to claim 1, further comprising:

identifying a plurality of 5G-enabled vehicles in proximity to the endpoint environment;

determining an operational state and a current battery power level of each of the plurality of the 5G-enabled vehicles;

in response to determining that the operational state is idle and that the current battery power level is above a pre-established threshold, determining availability of a respective processing resource carried by each of the plurality of the 5G-enabled vehicles;

in response to determining that each of the plurality of the 5G-enabled vehicle carries the respective processing resource that is available, determining whether a total of the respective processing resources meets the demand of the user equipment; and in response to determining that the total of the respective processing resources meets the demand of the user equipment, allocating the respective processing resource carried by each of the plurality of the 5G-enabled vehicles and causing each of the plurality of the 5G-enabled vehicles to serve as a respective edge server to perform the computing task for the user equipment using the allocated respective processing resource.

9. The method according to claim 8, further comprising:

forming a mesh network comprising the plurality of the 5G-enabled vehicles, each of the plurality of the 5G-enabled vehicles serving as a computing node of the mesh network.

10. A system comprising:

one or more processors; and a non-transitory computer-readable storage media storing computer-executable instructions that, when executed by the one or more processors, causes the system to:

receive a request from a user equipment (UE) in an endpoint environment, the request indicating a demand for processing resources on an edge server to perform a computing task for the UE;

in response to the request, identify a first 5G-enabled vehicle in proximity to the endpoint environment;

determine an operational state and a power state of the first 5G-enabled vehicle, wherein determining the power state comprises determining a current battery power level of the first 5G-enabled vehicle;

in response to determining that the operational state is idle and that the current battery power level is above a predetermined threshold, determine availability of a first processing resource carried by the first 5G-enabled vehicle;

in response to determining that the first 5G-enabled vehicle carries the first processing resource that is available, determine whether the first processing resource carried by the first 5G-enabled vehicle meets the demand of the user equipment; and in response to determining that the first processing resource meets the demand of the user equipment, allocate the first processing resource carried by the first 5G-enabled vehicle and cause the first 5G-enabled vehicle to serve as an edge server to perform the computing task for the user equipment using the allocated first processing resource.

11. The system of claim 10, wherein, when executed by one or more processors, the computer-executable instructions further cause the system to:

perform user authentication to authenticate the user of the user equipment to use the first processing resource of the first 5G-enabled vehicles and verify that the user equipment is eligible to use the first processing resource.

12. The system of claim 10, wherein, when executed by one or more processors, the computer-executable instructions further cause the system to:

determine that a central processing unit (CPU) of the first 5G-enabled vehicle is idle and predicted to continue to be idle for a particular time period; and determine that the CPU is included in the first processing resource to be allocated for and used by the user equipment for the particular time period.

13. The system of claim 10, wherein, when executed by one or more processors, the computer-executable instructions further cause the system to:

determine whether a current level of processing resources carried by the first 5G-enabled vehicle meets both the demand by the user equipment and a self-demand by the first 5G-enabled vehicle; and in response to determining that the current level of processing resources carried by the first 5G-enabled vehicle meets both the demand by the user equipment and a self-demand by the first 5G-enabled vehicle, determine that the processing resource requested by the user equipment is available.

14. The system of claim 10, wherein, when executed by one or more processors, the computer-executable instructions further cause the system to:

determine whether a current usage of processing resource by the first 5G-enabled vehicle to perform primary tasks for the 5G-enabled vehicle is below a pre-established threshold level; and in response to determining that the current usage of processing resource is below the pre-established threshold level, determine that the first processing resource carried by the 5G-enabled vehicle is available.

15. The system of claim 10, wherein, when executed by one or more processors, the computer-executable instructions further cause the system to:

receive a request by the first 5G-enabled vehicle to cease the using of the allocated first processing resource; and in response to the request, cause the first 5G-enabled vehicle to cease the using of the first processing resource.

16. The system of claim 15, wherein, when executed by one or more processors, the computer-executable instructions further cause the system to:

identify a second 5G-enabled vehicle in proximity to the endpoint environment;

determine that the second 5G-enabled vehicle carries a second processing resource that is available and meets the demand of the user equipment; and allocate the second processing resource carried by the second 5G-enabled vehicle and cause the second SG-enabled vehicle to serve as a second edge server to continue performing the computing task for the user equipment using the allocated second processing resource.

17. The system of claim 10, wherein, when executed by one or more processors, the computer-executable instructions further cause the system to:

identify a plurality of 5G-enabled vehicles in proximity to the endpoint environment;

determine an operational state and a current battery power level power state of each of the plurality of the 5G-enabled vehicles;

in response to determining that the operational state is idle and that the current battery power level is above a pre-established threshold, determine availability of a respective processing resource carried by each of the plurality of the 5G-enabled vehicles;

in response to determining that each of the plurality of the 5G-enabled vehicle carries the respective processing resource that is available, determine whether a total of the respective processing resources meets the demand of the user equipment; and in response to determining that the total of the respective processing resources meets the demand of the user equipment, allocate the respective processing resource carried by each of the plurality of the 5G-enabled vehicles and cause each of the plurality of the 5G-enabled vehicles to serve as a respective edge server to perform the computing task for the user equipment using the allocated respective processing resource.

18. The system of claim 17, wherein, when executed by one or more processors, the computer-executable instructions further cause the system to:

form a mesh network comprising the plurality of the 5G-enabled vehicles, each of the plurality of the 5G-enabled vehicles serving as a computing node of the mesh network.

* * * * *